(12) United States Patent
Partovi et al.

(10) Patent No.: US 7,571,226 B1
(45) Date of Patent: Aug. 4, 2009

(54) CONTENT PERSONALIZATION OVER AN INTERFACE WITH ADAPTIVE VOICE CHARACTER

(75) Inventors: Hadi Partovi, San Francisco, CA (US); Roderick Steven Brathwaite, Livermore, CA (US); Angus Macdonald Davis, Sunnyvale, CA (US); Michael S. McCue, Los Gatos, CA (US); Brandon William Porter, Mountain View, CA (US); John Giannandrea, Palo Alto, CA (US); Eckart Walther, Redwood City, CA (US); Zhe Li, Daly City, CA (US)

(73) Assignee: TellMe Networks, Inc., Mountain View, CA (US)

( * ) Notice: Subject to any disclaimer, the term of this patent is extended or adjusted under 35 U.S.C. 154(b) by 0 days.

(21) Appl. No.: 09/523,853

(22) Filed: Mar. 13, 2000
(Under 37 CFR 1.47)

Related U.S. Application Data

(63) Continuation of application No. 09/426,102, filed on Oct. 22, 1999, now Pat. No. 6,807,574.

(51) Int. Cl.
*G06F 15/16* (2006.01)
*G06F 15/173* (2006.01)
(52) U.S. Cl. .............. 709/224; 709/203; 709/217; 709/219; 709/226
(58) Field of Classification Search ............ 704/205; 709/217–219, 200–204, 224, 226; 379/88.05, 379/88.17, 220.01, 10.01, 88.13, 88.25, 207.15, 379/88.04, 88.16
See application file for complete search history.

(56) References Cited

U.S. PATENT DOCUMENTS 4,443,856 A    4/1984   Hashimoto et al.

(Continued)

FOREIGN PATENT DOCUMENTS

EP    0841831    5/1998

(Continued)

OTHER PUBLICATIONS

Busch, M. et al., "Optimal Telephone Line Allocation of Voice ADS System", *Proceedings of the 1993 Winter Simulation Conference*, Dec. 12-15, 1993, pp. 1359-1360.

(Continued)

*Primary Examiner*—Quang N. Nguyen
(74) *Attorney, Agent, or Firm*—Perkins Coie LLP

(57) ABSTRACT

A method and apparatus for providing personalized information content over telephones is described. The creation of a voice portal is supported by the invention. Embodiments of the invention use telephone identifying information such as the calling party's number to identify, or create, user profiles for customization. The personalized content is specific to that user based on her/his telephone identifying information and may be further customized based on the current time, current date, the calling party's locales, and/or the calling party's dialect and speech patterns. In some embodiments, the dialect is selected from a range of common American English dialects according to the locale of the calling party. For example, callers from the Northern Midland will automatically hear a Northern Midland dialect, while callers from the Coastal Southeast will hear that dialect, etc. Individuals can change the dialect to better suit their personal tastes.

17 Claims, 4 Drawing Sheets

U.S. PATENT DOCUMENTS

| | | | |
|---|---|---|---|
| 4,468,528 A | 8/1984 | Reece et al. | |
| 4,588,865 A | 5/1986 | Hestad | |
| 4,612,416 A | 9/1986 | Emerson et al. | |
| 4,627,819 A | 12/1986 | Burrows | |
| 4,639,877 A | 1/1987 | Raymond et al. | |
| 4,668,194 A | 5/1987 | Narayanan | |
| 4,800,438 A | 1/1989 | Yuter | |
| 5,020,101 A | 5/1991 | Brotz et al. | |
| 5,131,045 A | 7/1992 | Roth | |
| 5,177,800 A | 1/1993 | Coats | |
| 5,206,899 A | 4/1993 | Gupta et al. | |
| 5,208,745 A | 5/1993 | Quentin et al. | 364/188 |
| 5,236,199 A | 8/1993 | Thompson, Jr. | |
| 5,283,888 A | 2/1994 | Dao et al. | 395/500 |
| 5,359,645 A | 10/1994 | Katz | 379/93 |
| 5,463,696 A | 10/1995 | Beernink et al. | 382/186 |
| 5,465,378 A | 11/1995 | Duensing et al. | 395/800 |
| 5,493,606 A | 2/1996 | Osder et al. | 379/67 |
| 5,497,373 A | 3/1996 | Hulen et al. | 370/79 |
| 5,566,272 A | 10/1996 | Brems et al. | |
| 5,594,638 A | 1/1997 | Iliff | |
| 5,600,765 A | 2/1997 | Ando et al. | 395/133 |
| 5,631,949 A | 5/1997 | Milton et al. | |
| 5,632,002 A | 5/1997 | Hashimoto et al. | 395/2.4 |
| 5,642,407 A | 6/1997 | He | |
| 5,655,910 A | 8/1997 | Troudet | |
| 5,661,787 A | 8/1997 | Pocock et al. | |
| 5,664,126 A | 9/1997 | Hirakawa et al. | |
| 5,704,007 A | 12/1997 | Cecys | |
| 5,710,887 A | 1/1998 | Chelliah et al. | |
| 5,729,599 A | 3/1998 | Plomondon et al. | |
| 5,732,395 A | 3/1998 | Alexander Silverman | |
| 5,745,877 A | 4/1998 | Nijmam et al. | |
| 5,745,882 A | 4/1998 | Bixler et al. | |
| 5,749,072 A | 5/1998 | Mazurkiewicz et al. | 704/275 |
| 5,758,322 A | 5/1998 | Rongley | 704/275 |
| 5,761,641 A | 6/1998 | Rozak et al. | 704/275 |
| 5,771,276 A | 6/1998 | Wolf | |
| 5,774,859 A | 6/1998 | Houser et al. | |
| 5,787,414 A | 7/1998 | Miike et al. | |
| 5,793,980 A | 8/1998 | Glaser et al. | |
| 5,799,063 A | 8/1998 | Krane | 379/67 |
| 5,809,269 A | 9/1998 | Favot et al. | 395/376 |
| 5,819,220 A | 10/1998 | Sarukkai et al. | 704/243 |
| 5,822,405 A | 10/1998 | Astarabadi | |
| 5,832,065 A | 11/1998 | Bannister et al. | |
| 5,832,433 A | 11/1998 | Yashchin et al. | |
| 5,844,158 A | 12/1998 | Butler et al. | |
| 5,852,610 A | 12/1998 | Olaniyan | |
| 5,872,779 A | 2/1999 | Vaudreuil | |
| 5,873,064 A | 2/1999 | De Armas et al. | 704/275 |
| 5,875,422 A * | 2/1999 | Eslambolchi et al. | |
| 5,875,429 A | 2/1999 | Douglas | 704/275 |
| 5,878,118 A | 3/1999 | Mohr et al. | |
| 5,884,262 A | 3/1999 | Wise et al. | 704/270 |
| 5,884,265 A | 3/1999 | Squitteri et al. | 704/275 |
| 5,884,266 A | 3/1999 | Dvorak | 704/275 |
| 5,893,063 A | 4/1999 | Loats et al. | 704/275 |
| 5,897,618 A | 4/1999 | Loats et al. | 704/275 |
| 5,899,975 A | 5/1999 | Nielsen | |
| 5,901,246 A | 5/1999 | Hoffberg et al. | |
| 5,903,867 A | 5/1999 | Watari et al. | |
| 5,915,001 A | 6/1999 | Uppaluru | 379/88.22 |
| 5,915,238 A | 6/1999 | Tjaden | |
| 5,918,213 A | 6/1999 | Bernard et al. | 705/26 |
| 5,920,616 A | 7/1999 | Hazenfield | |
| 5,920,841 A | 7/1999 | Schottmuller et al. | 704/275 |
| 5,926,789 A | 7/1999 | Barbara et al. | 704/275 |
| 5,930,755 A | 7/1999 | Cecys | |
| 5,933,811 A | 8/1999 | Angles et al. | |
| 5,937,037 A | 8/1999 | Kamel et al. | |
| 5,945,989 A | 8/1999 | Freishtat et al. | 345/329 |
| 5,949,854 A * | 9/1999 | Sato | 379/88.16 |
| 5,953,005 A | 9/1999 | Liu | |
| 5,953,392 A | 9/1999 | Rhie et al. | 379/88.13 |
| 5,953,700 A | 9/1999 | Kanevsky et al. | |
| 5,960,394 A | 9/1999 | Gould et al. | |
| 5,970,124 A | 10/1999 | Csaszar et al. | |
| 5,978,450 A | 11/1999 | McAllister et al. | |
| 5,983,187 A | 11/1999 | Haddock et al. | |
| 5,999,611 A | 12/1999 | Tatchell et al. | |
| 6,009,150 A | 12/1999 | Kamel | |
| 6,014,428 A | 1/2000 | Wolf | |
| 6,026,153 A | 2/2000 | Fuller et al. | |
| 6,044,376 A | 3/2000 | Kurtzman, II | |
| 6,067,348 A | 5/2000 | Hibbeler | |
| 6,088,683 A | 7/2000 | Jalili | |
| 6,097,793 A | 8/2000 | Jandel et al. | |
| 6,101,486 A | 8/2000 | Roberts et al. | |
| 6,115,747 A | 9/2000 | Billings et al. | |
| 6,144,938 A | 11/2000 | Surace et al. | |
| 6,144,939 A | 11/2000 | Pearson et al. | |
| 6,144,988 A | 11/2000 | Kappel | |
| 6,157,705 A | 12/2000 | Perrone | |
| 6,161,128 A * | 12/2000 | Smyk | 709/201 |
| 6,163,765 A | 12/2000 | Andric et al. | |
| 6,175,821 B1 | 1/2001 | Page et al. | |
| 6,185,535 B1 | 2/2001 | Hedin et al. | |
| 6,189,008 B1 | 2/2001 | Easty et al. | |
| 6,199,099 B1 | 3/2001 | Gershman et al. | |
| 6,204,862 B1 | 3/2001 | Barstow et al. | |
| 6,212,262 B1 | 4/2001 | Kamel | |
| 6,215,858 B1 | 4/2001 | Bartholomew et al. | |
| 6,240,170 B1 * | 5/2001 | Shaffer et al. | 379/88.05 |
| 6,240,384 B1 | 5/2001 | Kagoshima et al. | |
| 6,266,400 B1 * | 7/2001 | Castagna | 379/88.25 |
| 6,269,336 B1 * | 7/2001 | Ladd et al. | 379/88.13 |
| 6,285,984 B1 | 9/2001 | Speicher | |
| 6,298,348 B1 | 10/2001 | Eldering | |
| 6,314,402 B1 | 11/2001 | Monaco et al. | |
| 6,323,911 B1 | 11/2001 | Schein et al. | |
| 6,324,519 B1 | 11/2001 | Eldering | |
| 6,330,550 B1 | 12/2001 | Brisebois et al. | |
| 6,332,127 B1 | 12/2001 | Bandera et al. | |
| 6,333,979 B1 * | 12/2001 | Bondi et al. | 379/220.01 |
| 6,334,103 B1 | 12/2001 | Surace et al. | |
| 6,341,264 B1 | 1/2002 | Kuhn et al. | |
| 6,385,584 B1 * | 5/2002 | McAllister et al. | 379/10.01 |
| 6,396,907 B1 | 5/2002 | Didcock et al. | |
| 6,411,932 B1 | 6/2002 | Molnar et al. | |
| 6,418,440 B1 * | 7/2002 | Kuo et al. | 707/10 |
| 6,421,669 B1 | 7/2002 | Gilmour et al. | |
| 6,438,523 B1 | 8/2002 | Oberteuffer et al. | |
| 6,449,657 B2 | 9/2002 | Stanbach, Jr. et al. | |
| 6,453,164 B1 | 9/2002 | Fuller et al. | |
| 6,456,699 B1 * | 9/2002 | Burg et al. | 379/88.17 |
| 6,466,654 B1 | 10/2002 | Cooper et al. | |
| 6,470,181 B1 | 10/2002 | Maxwell | |
| 6,470,316 B1 | 10/2002 | Chihara et al. | |
| 6,483,523 B1 | 11/2002 | Feng et al. | |
| 6,484,263 B1 | 11/2002 | Liu | |
| 6,490,562 B1 | 12/2002 | Kamai et al. | |
| 6,505,161 B1 | 1/2003 | Brems | |
| 6,591,240 B1 | 7/2003 | Abe et al. | |
| 6,591,263 B1 | 7/2003 | Becker et al. | |
| 6,597,765 B1 * | 7/2003 | Ksiazek | 379/88.06 |
| 6,643,362 B2 | 11/2003 | Hogan et al. | |
| 6,668,353 B1 | 12/2003 | Yurkovic | |
| 6,732,078 B1 | 5/2004 | Luomi et al. | |
| 6,757,362 B1 | 6/2004 | Cooper et al. | |
| 6,807,574 B1 | 10/2004 | Partovi et al. | 709/224 |
| 6,810,378 B2 | 10/2004 | Kochanski et al. | |
| 6,842,767 B1 | 1/2005 | Partovi et al. | |
| 6,873,952 B1 | 3/2005 | Bailey et al. | |

| | | | |
|---|---|---|---|
| 6,925,444 | B1 | 8/2005 | McCollom et al. |
| 6,941,273 | B1 | 9/2005 | Loghmani et al. |
| 6,970,915 | B1 | 11/2005 | Partovi et al. |
| 6,996,609 | B2 | 2/2006 | Hickman et al. |
| 7,047,194 | B1 | 5/2006 | Buskies et al. |
| 7,072,932 | B1 | 7/2006 | Stahl |
| 7,082,397 | B2 | 7/2006 | Cohen et al. |
| 7,143,039 | B1 | 11/2006 | Stifelman et al. |
| 7,260,187 | B1* | 8/2007 | McAllister ............... 379/88.04 |
| 7,269,557 | B1 | 9/2007 | Bailey et al. |
| 7,308,408 | B1 | 12/2007 | Stifelman et al. |
| 7,330,890 | B1 | 2/2008 | Partovi et al. |
| 7,376,586 | B1 | 5/2008 | Partovi et al. |
| 2001/0021948 | A1 | 9/2001 | Khouri et al. |
| 2001/0048738 | A1 | 12/2001 | Baniak et al. |
| 2002/0013827 | A1 | 1/2002 | Edstrom et al. |
| 2003/0147518 | A1* | 8/2003 | Albal et al. ............ 379/207.15 |

FOREIGN PATENT DOCUMENTS

| | | |
|---|---|---|
| EP | 0845894 | 6/1998 |
| EP | 0 859 500 A2 | 8/1998 |
| EP | 0 847 179 A2 | 10/1998 |
| EP | 0 889 627 A2 | 7/1999 |
| WO | WO-98/10361 | 3/1998 |
| WO | WO 98/56154 | 10/1998 |
| WO | WO 98/56154 | 12/1998 |
| WO | WO-99/00758 | 7/1999 |

OTHER PUBLICATIONS

Hindus, D. et al., "Capturing, Structuring, and Representing Ubiquitous Audio", *ACM Transactions on Information Systems*, vol. 11, No. 4, Oct. 1993, pp. 376-400.
Hundus, D. et al., "Ubiquitous Audio: Capturing Spontaneous Collaboration", *Proceedings of the Conference on Computer-Supported Cooperative Work*, Nov. 1992, pp. 210-217.
Resnick, P., "HyperVoice—A Phone-Based CSCW Platform", *Proceedings of the Conference on Computer-Supported Cooperative Work*, Nov. 1992, pp. 218-225.
Resnick, P., "Phone-Based CSCW: Tools and Trials", *ACM Transactions on Information Systems*, vol. 11, No. 4, Oct. 1993, pp. 401-424.
Resnick, P. et al., "Skip and Scan: Cleaning Up Telephone Interfaces", *CHI '92 Conference Proceedings—ACM Conference on Human Factors in Computing Systems*, May 1992, pp. 419-426.
Schmandt, C., "Phoneshell: the Telephone as Computer Terminal", *Proceedings ACM Multimedia 93*, Aug. 1993, pp. 373-382.
Bolt, R., ""Put-That-There": Voice and Gesture at the Graphics Interface", *SIGGRAPH '80 Conference Proceedings, Quarterly Report of SIGGRAPH-ACM*, Jul. 1980, pp. 262-270.
Brown, M., "Surf and Speak Services", *PC Magazine*, Mar. 21, 2000, p. 64.
Hemphill, C. et al., "Surfing the Web by Voice", *Proceedings of ACM Multimedia '95*, Nov. 1995, pp. 215-222.
Rudnicky, A. et al., "Spoken language recognition in an office management domain", *ICASSP '91, International Conference on Acoustics, Speech, And Signal Processing*, May 1991, pp. 829-832.
"Integrated Audio-Graphics User Interface", *IBM Technical Disclosure Bulletin*, Apr. 1991, pp. 368-371.
"Voice Augmented Menu Automated Telephone Response System", *IBM Technical Disclosure Bulletin*, Feb. 1995, pp. 57-62.
"Speech Recognition—Kurzweil Brings Voice Dictation to Windows", *BYTE Magazine*, Aug. 1994, p. 48.
Hemphill, Charles T., et al., "Surfing the Web by Voice", *Proceedings—ACM Multimedia '95*, San Francisco, CA, ACM 0-89791 (Nov. 1995), pp. 215-222.
Hemphill, Charles T., et al., "Speech-Aware Multimedia", *IEEE Multimedia*, IEEE (1996), pp. 74-78.
Lau, Raymond, et al., "WebGALAXY: beyond point and click—a conversational interface to a browser", *Computer Networks and ISDN Systems*, vol. 29 (1997), pp. 1385-1393.
Zue, Victor W., "Navigating the Information Superhighway Using Spoken Language Interfaces", *IEEE Expert*, IEEE, Oct. 1995, pp. 39-43.

Seneff, Stephanie, et al., "GALAXY-II: A Reference Architecture For Conversational System Development", technical paper, Massachusetts Institute of Technology (1998), 4 pages.
Meng, Helen, et al., "WHEELS: A Conversational System in the Automobile Classifieds Domain", *Proceedings—Fourth Intl. Conf. on Spoken Language Processing (ICSLP '96)*, Oct. 1996, pp. 542-545.
Goddeau, David, et al., "A Form-Based Dialogue Manager For Spoken Language Applications", *Proceedings—Fourth Intl. Conf. on Spoken Language Processing (ICSLP '96)*, Oct. 1996, pp. 701-704.
Lieberman, Henry , "Attaching Interface Agent Software to Applications", unpublished draft, Media Laboratory, Massachusetts Institute of Technology, circa 1993, 8 pages.
Schmandt, Chris, "Phoneshell: the telephone as computer terminal", as printed in *Proceedings of the conference on Multimedia '93*, pp. 373-382 (1993).
"VoxML 1.0 Language Reference", Revision 1.0a, Motorola, Inc., Oct. 1998, pp. 1-51.
"VoxML 1.0 Application Development Guide", Revision 1.0, Motorola, Inc., Sep. 1998, pp. 1-31.
Motorola VoxML Team, "VoxML SDK 1.0a Interim Release Notes", Motorola, Inc., Dec. 1998, 5 pages.
VoiceXML Forum, "Voice Extensible Markup Language—VoiceXML", Version 0.9, Aug. 1999, 63 pages.
James, Frankie, "AHA: audio HTML access", *Computer Networks and ISDN Systems*, vol. 29 (1997), pp. 1395-1404.
James, Frankie, "Lessons from Developing Audio HTML Interfaces", *Proceedings of The Third Intl. ACM Conf. on Assistive Technologies (ASSETS '98)*, ACM Press, Apr. 1998, pp. 27-34.
Raman, T.V., "Cascaded speech style sheets", *Computer Networks and ISDN Systems*, vol. 29 (1997), pp. 1377-1383.
Abrams, Marc, et al., "UIML: an appliance-independent XML user interface language", *Computer Networks*, vol. 31 (1999), pp. 1695-1708.
VoiceXML Forum, "Voice eXtensible Markup Language (VoiceXML)—Technical Background", copyright AT&T (1999), printed from website "www.vxmlforum.org/tech_bkgrnd.html" Aug. 17, 1999, 3 pages.
Cover, Robin, "The SGML/XML Web Page—Speech ML", Feb. 22, 1999, printed from website "www.oasis-open.org/cover/speechML.html" Aug. 17, 1999, 2 pages.
Cover, Robin, "The SGML/XML Web Page—VoxML Markup Language", Mar. 2, 1999, printed from website "www.oasis-open.org/cover/speechML.html" Aug. 17, 1999, 3 pages.
"Call Center Products", Edify Corp., copyright 1994-1999, printed from website "www.edify.com/templates/basic.asp?nodeid=665" Aug. 24, 1999, 1 page.
"Financial Services Products", Edify Corp., copyright 1994-1999, printed from website "www.edify.com/templates/basic.asp?nodeid=105" Aug. 24, 1999, 1 page.
"Technology Overview", Edify Corp., copyright 1994-1999, printed from website "www.edify.com/templates/basic.asp?nodeid=125" Aug. 24, 1999, 2 pages.
"Customer List", Edify Corp., copyright 1994-1999, printed from website "www.edify.com/templates/cust_list.asp?nodeid=145" Aug. 24, 1999, 2 pages.
"Customer Case Studies", Edify Corp., copyright 1994-1999, printed from website "www.edify.com/templates/cust_case_list.asp?nodeid=146" Aug. 24, 1999, 5 pages.
"Electronic Workforce Overview", Edify Corp., copyright 1994-1999, printed from website "www.edify.com/demos/elec_work_tour/*.html" Aug. 24, 1999, 13 pages.
"pwWebSpeak: General Information" and "pwWebSpeak Overview", The Productivity Works, copyright 1996-1999, last updated May 20, 1998, printed from website "www.prodworks.com/*.htm" Aug. 19, 1999, 5 pages.
Raman, T.V., "Emacspeak—Direct Speech Access", *Proceedings of The Second Annual ACM Conference on Assistive Technologies (ASSETS '96)*, ACM, Apr. 1996, pp. 32-36.
Krell, Mitchell, et al., "V-Lynx: Bringing the World Wide Web to Sight Impaired Users", *Proceedings of The Second Annual ACM Conference on Assistive Technologies (ASSETS '96)*, ACM, Apr. 1996, pp. 23-26.

"The AirFlash Search Engine", AirFlash, Inc., printed from website "www.airflash.com/afad_works_main.html" Aug. 17, 1999, 1 page.

Zajicek, Mary, et al., "A Web Navigation Tool for the Blind", *Proceedings of The Third Annual ACM Conference on Assistive Technologies (ASSETS '98)*, ACM, Apr. 1998, pp. 204-206.

Natural Language Speech Recognition systems from Nuance Communications, printed from website "www.nuance.com/*" Aug. 17, 1999, 9 pages.

"Nuance 6", product description, Nuance Communications, Menlo Park, CA, (1999), 2 pages.

"Nuance Developer's Toolkit", Nuance Communications, Menlo Park, CA, (1998), 2 pages.

V-Commerce™ product overview, introduction and demos, V-Commerce™, printed from website www.V-Commerce.com/* Aug. 17, 1999, 11 pages.

V-Commerce™ White Paper, Paper No. WP006-0998, V-Commerce™, Menlo Park, CA, Oct. 6, 1998, 8 pgs.

"Nuance SpeechObjects and V-Commerce Applications", a Nuance white paper, Nuance Communications, Menlo Park, CA, (1999), 13 pages.

Asakawa, Chieko, et al., "User Interface of a Home Page Reader", *Proceedings of The Third Annual ACM Conference on Assistive Technologies (ASSETS '98)*, ACM, Apr. 1998, pp. 149-156.

Bayer, Samuel, "Embedding Speech in Web Interfaces", *Proceedings of The Fourth Annual Conference on Spoken Language Processing (ICSLP 96)*, Oct. 1996, pp. 1684-1687.

Kondo, Kazuhiro, et al., "Surfin' The World Wide Web With Japanese", *1997 IEEE International Conference on Acoustics, Speech, and Signal Processing*, vol. II of V, Apr. 1997, pp. 1151-1154.

Corrick, David, et al., "'ELTON' Takes Orders for New Zealand Wines & Spirits", *Speech Technology*, Sep./Oct. 1988, pp. 87-89.

Mynatt, Elizabeth D., et al., "Mapping GUIs to Auditory Interfaces", *proceedings of the Fifth Annual Symposium on User Interface Software and Technology (UIST)*, ACM, Nov. 1992, pp. 61-70.

Gamm, Stephan, et al., "Findings with the Design of a Command-Based Speech Interface for a Voice Mail System", *Proceedins of the Third IEEE Workshop on Interactive Voice Technology for Telecommunications Applications (IVTTA-96)*, IEEE Communications Society, Sep. 1996, pp. 93-96.

Markowitz, Judith A., "Using Speech Recognition", Prentice Hall PTR, (1996), 293 pages.

Life, A., et al., "Data Collection for the MASK Kiosk: WOz vs Prototype System", *Proceedings of the Fourth International Conference on Spoken Language Processing (ICSLP 96)*, Oct. 1996, pp. 1672-1675.

Gauvain, J.L., et al., "Speech Recognition for an Information Kiosk", *Proceedings of the Fourth International Conference on Spoken Language Processing (ICSLP 96)*, Oct. 1996, pp. 849-852.

Mazor, Baruch, et al., "OASIS—A Speech Recognition System for Telephone Service Orders", *Proceedings of the 1994 International Conference on Spoken Language Processing (ICSLP 94)*, Sep. 1994, pp. 679-682.

Oerder, Martin, et al., "A Realtime Prototype of an Automatic Inquiry Systsm", *Proceedings of the 1994 International Conference on Spoken Language Processing (ICSLP 94)*, Sep. 1994, pp. 703-706.

Jurafsky, Daniel, et al., "The Berkeley Restaurant Project", *Proceedings of the 1994 International Conference on Spoken Language Processing (ICSLP 94)*, Sep. 1994, pp. 2139-2142.

Fugitt, Mitchell L., "A Voice Actuated Data Entry System for Analytical Data Collection", *Speech Technology* Oct./Nov. 1989, pp. 26-29.

Chien, Lee-Feng, et al., "Internet Chinese Information Retrieval Using Unconstrained Mandarin Speech Queries Based on A Client-Server Architecture and A PAT-tree-based Language Model", *1997 IEEE Intl. Conference on Acoustics, Speech, and Signal Processing*, vol. II of V, Apr. 1997, pp. 1155-1158.

Walker, Marilyn A., et al., "What Can I Say?: Evaluating a Spoken Language Interface to Email", *Human Factors in Computing Systems (CHI-98), Conference Proceedings*, ACM Press, Apr. 1998, pp. 582-589.

Schmandt, Chris, et al., "Augmenting a Window System with Speech Input", *IEEE*, Aug. 1990, pp. 50-55.

Rudnicky, Alexander I., et al., "SpeechWear: A mobile speech system", *Proceedings of the Fourth International Conference on Spoken Language Processing (ICSLP 96)*, Oct. 1996, pp. 538-541.

Mellor, B.A., et al., "Evaluating Automatic Speech Recognition as a Component of a Multi-Input Device Human-Computer Interface", *Proceedings of the Fourth International Conference on Spoken Language Processing (ICSLP 96)*, Oct. 1996, pp. 1668-1671.

Katsuura, Makoto, et al., "The WWW Browser System with Spoken Keyword Recognition", *Transactions of Information Processing Society of Japan*, vol. 40, No. 2, Feb. 1999, pp. 443-452.

Asakawa, Chieko, et al., "User Interface of a Non-visual Web Access System", *Transactions of Information Processing Society of Japan*, vol. 40, No. 2, Feb. 1999, pp. 453-459.

Nakajima, Hideharu, et al., "Multimodal Interaction with WWW Browsers—An Interface Using Mouse Movement and Voiced Command", *Transactions of Information Processing Society of Japan*, vol. 39, No. 42, Apr. 1998, pp. 1127-1136.

Graziani, Paolo, et al., "Screen Reader for Windows Based on Speech Output", *Computers for Handicapped Persons, Proceedings of the 4th International Conference (ICCHP '94)*, Sep. 1994, pp. 96-100.

Boyd, F.W., Jr., "The Story of Tootie", *Proceedings—AVIOS '88, Voice I/O Systems Applications Conference*, Oct. 1988, 4 pages.

Brooks, Rodney, et al., "Voice Controlled Telephone Banking", *Proceedings—AVIOS '88, Voice I/O Systems Applications Conference*, Oct. 1988, 6 pages.

"American Express Credit Authorization Voice Response System", *Proceedings—AVIOS '87, Voice I/O Systems Applications Conference*, Oct. 1987, pp. 171-174.

Hein, J. Rand, "Customer Service Applications Using Voice Response And Agent Automation in a Banking Environment", *Proceedings—AVIOS '89, Voice I/O Systems Applications Conference*, Sep. 1989, pp. 9-14.

Olaszy, Gabor, et al., "IVR For Banking and Residential Telephone Subscribers Using Stored Messages Combined With a New Number-To-Speech Synthesis Method", *Human Factors and Voice Interactive Systems*, Kluwer Academic Publishers (1999), pp. 237-255.

Minker, Wolfgang, "Stochastic versus rule-based speech understanding for information retrieval", *Speech Communication*, vol. 25 (1998), pp. 223-247.

Mazor, B., et al., "The design of speech-interactive dialogs for transaction-automation systems", *Speech Communication*, vol. 17 (1995), pp. 313-320.

Morley, Sarah, et al., "Auditory Navigation in Hyperspace: Design and Evaluation of a Non-Visual Hypermedia System for Blind Users", *Proceedings of the Third Intl. ACM Conference on Assistive Technologies (ASSETS '98)*, ACM Press, Apr. 1998, pp. 100-107.

Quan, Margaret, "Application moves voice recognition out of expert realm", *Electronic Engineering Times*, Aug. 16, 1999, p. 60.

Johnson, R. Colin, "Neural speech system tackles e-commerce", *Electronic Eng. Times*, May 31, 1999, p. 44.

Poor, Alfred, "Talking to the Web, Part III", *PC Magazine*, Sep. 1, 1999, p. 80.

"CNN—No clicking, no buttons: com . . . ers 'speech sites'—Jul. 30, 1999", printed from website "www.cnn.com/TECH/ptech/9907/30/voicerec/" Aug. 25, 1999, 4 pages.

"Buyers's Guide 2000", Computer Telephony, Aug. 1999, advertisements for envox, "VisualVoice 5.0" (Artisoft), "CallSuite Starter Bundle (Parity Software)", "PRONEXUS" "Infinity System (Amtelco)", "Lucent Speech Solutions (Lucent Technologies)", "SpeechWorks" and others, 10 pages.

Lieberman, Henry, "Attaching Interface Agent Software to Applications", circa 1997, 8 pages.

B. Mazor et al., "The Design of Speech-Interactive Dialogs for Transaction-Automation Systems", Feb. 17, 1995, GTE Laboratories Inc., 40 Sylvan Rd., Waltham MA 02254, USA.

Gardner-Bonneau, "Human Factors and Voice Interactive Systems", 1999, Kluwer Academic Publishers, 101 Philip Dr., Norwell, MA 02061 USA.

Mazor et al., "OASIS- A Speech Recognition System for Telephone Service Orders", 1994, GTE Laboratories Inc., 40 Sylvan Rd., Waltham MA 02254, USA.

Hemphill et al., "Speech-Aware Multimedia", Spring 1996, IEEE Multimedia.

"VoxML 1.0 Application Development Guide", Sep. 1998, Motorola, Inc., Consumer Applications and Services Division, 55 Shurman Blvd., Ste. 600, Naperville, IL 60563 USA.

Hemphill et al., "Surfing the Web by Voice", Nov. 1995, ACM Multimedia '95, San Francisco, CA.

Lau et al.; "WebGALAXY: Beyond Point and Click—A Controversial Interface to a Browser"; 1997; Computer Networks, ISDN Systems 29; 10 pages.

B. Mazor et al., "The Design of Speech-Interactive Dialogs for Transaction-Automation Systems", Feb. 17, 1995, GTE Laboratories Inc., 40 Sylvan Rd., Waltham MA 02254, USA.

Gardner-Bonneau, "Human Factors and Voice Interactive Systems", 1999, Kluwer Academic Publishers, 101 Philip Dr., Norwell, MA 02061 USA.

Mazor et al., "Oasis- A Speech Recognition System for Telephone Service Orders", 1994, GTE Laboratories Inc., 40 Sylvan Rd., Waltham MA 02254, USA.

Hemphill et al., "Speech-Aware Multimedia", Spring 1996, IEEE Multimedia.

Lau et al., "Webgalaxy: Beyond Point and Click - A Conversational to a Browser", 1997, Computer Networks and ISDN Systems 29.

"VOXML 1.0 Application Development Guide", Sep. 1998, Motorola, Inc., Consumer Applications and Services Division, 55 Shurman Blvd., Ste. 600, Naperville, IL 60563 USA.

Hemphill et al., "Surfing the Web by Voice", Nov. 1995, ACM Multimedia '95, San Francisco, CA.

U.S. Appl. No. 11/009,789, filed Dec. 10, 2004, Partovi et al.

U.S. Appl. No. 11/943,549, filed Nov. 20, 2007, Stifelman et al.

U.S. Appl. No. 11/563,112, filed Nov. 24, 2006, Stifelman et al.

U.S. Appl. No. 09/579,965, filed May 26, 2000, Partovi et al.

"Voice Commerce: Odeon Cinemas Film Line Goes Live With Nuance Natural Language Speech Recognition," PR Newswire, Oct. 20, 1998, Proquest #35239756.

"BroadVision, Inc. Receives Patent for Broadvision One-To-One Application System Technology," PR Newswire, Feb. 5, 1998, Proquest #25878398.

"V-Commerce - The V-Commerce Alliance!", http://www.V-Commerce.com.

"VeriFone Offers Merchants Cost-Effective Access To Highly Secure Online Payment Through ISPs; ISPs Gain Increased Revenue Opportunities With VeriFone Offerings," Business Wire, Sep. 28, 1998, Dialog file 810 #0913108.

Finegan, Jay, "Sing to me, baby," Inc., vol. 15, No. 8, Aug. 1993, pp. 90-99.

Alley, D.M et al., "Audio Services for an asynchronous transfer mode network," BT Technol. J., vol 13, No. 3, Jul. 1995, pp. 80-90.

Finnigan, P. et al., "Audiotex: The telephone as data-access equipment," Data Communications, Nov. 1986, pp. 141-153.

"Voice Commerce: BroadVision Joins V-Commerce Alliance," PR Newswire, Oct. 6, 1998, Proquest #34848381.

"Voice Commerce: Motorola, Visa, BroadVision and Other Team With Nuance To Introduce V-Commerce," PR Newswire, Oct. 6, 1998, Request #34848385.

Dalton, Gregory, "Voice Commerce: Vendors Unite for Voice on The Web," Informationweek, Oct. 12, 1998, No. 704, p. 34, Proquest #87506874.

Hardy, Quentin, "Voice Commerce: Motorola Unveils New Technology for Internet Voice Commands," Asian Wall Street Journal, New York, N.Y., Oct. 1, 1998, p. 10, Proquest #34717710, 2 pages.

International Search Report; International Patent Application No. PCT/US00/41429; Filed: Oct. 20, 2000, Applicant: Tellme Networks, Inc.; Mailed on Apr. 10, 2001.

International Search Report; International Patent Application No. PCT/US00/41447; Filed: Oct. 19, 2000, Applicant: Tellme Networks, Inc.; Mailed on Apr. 10, 2001.

Langston, P., "(201) 644-2332 or Eedie & Eddie on the Wire - An Experiment in Music Generation," USENIX Association, Summer Conference Proceedings (Jun. 1986), pp. 13-27. Copies of non-patent literature have been provided in related U.S. Appl. No. 09/431,002 Information Disclosure Statement.

Quinton, Brian, "Voice Commerce: Reach Out And Touch The Web," Telephony, Oct. 19, 1998, vol. 235, No. 16, p. 43, Proquest #35273969.

Yasin, Rutrell, "An Embattled Encryption Standard Gets A Shot In The Arm," InternetWeek, Jul. 13, 1998, Issue 723, Proquest #31942425.

* cited by examiner

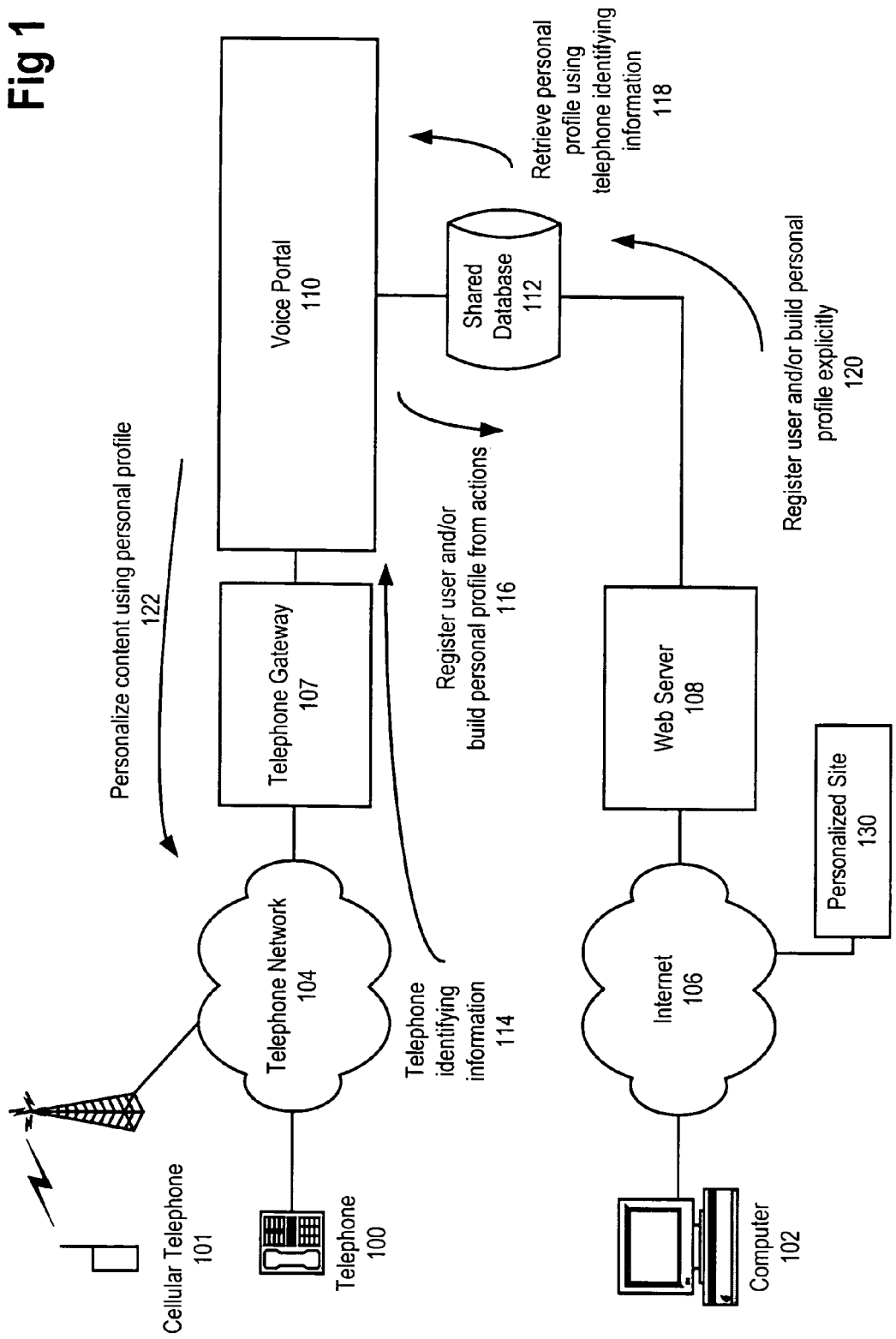

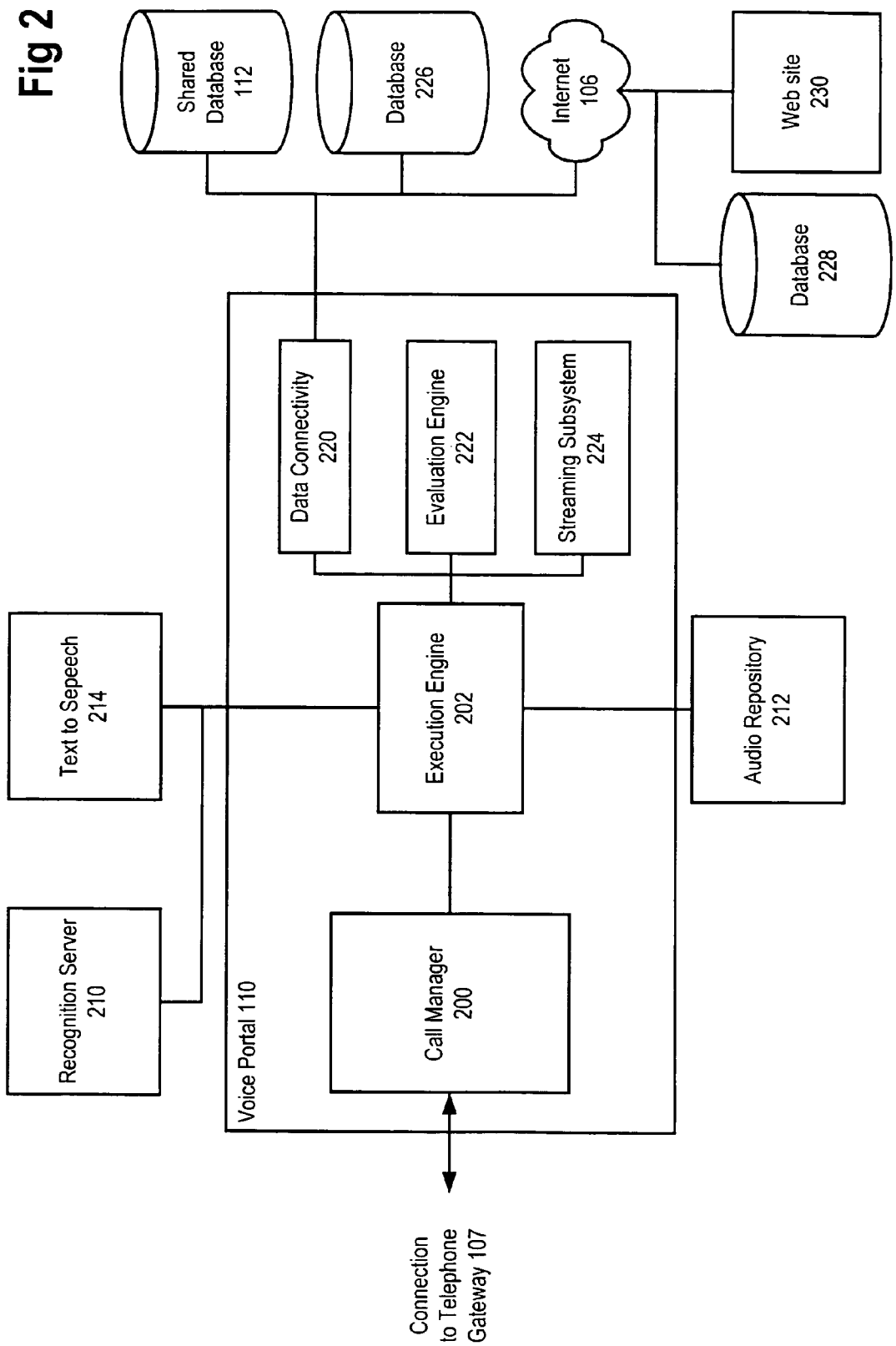

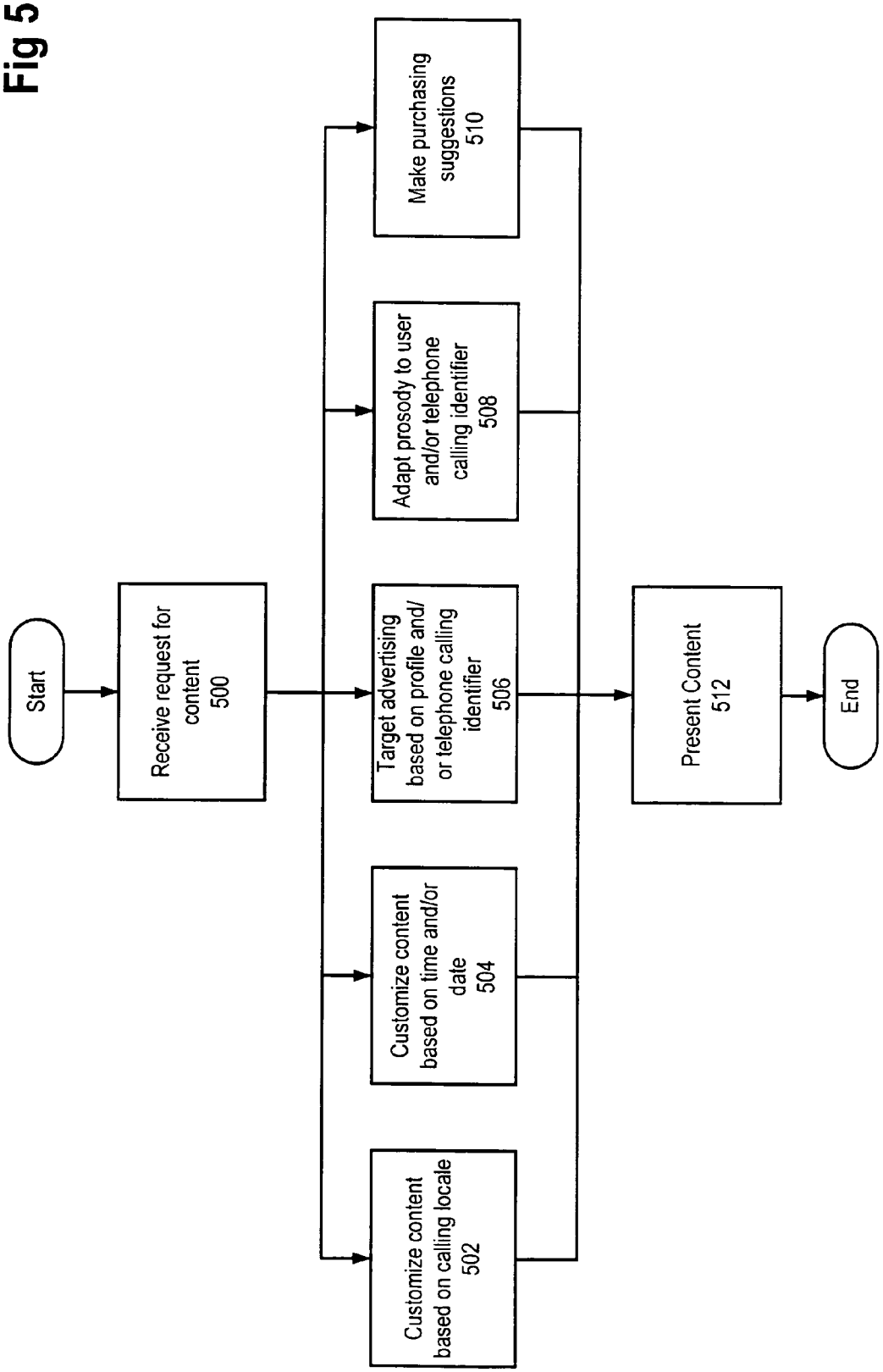

CONTENT PERSONALIZATION OVER AN INTERFACE WITH ADAPTIVE VOICE CHARACTER

RELATED APPLICATIONS

This application is a continuation of, incorporates by reference, and claims priority from, U.S. patent application Ser. No. 09/426,102, now U.S. Pat. No. 6,807,574 entitled, "Method and Apparatus for Content Personalization Over a Telephone Interface," filed Oct. 22, 1999, having inventors Hadi Partovi, Roderick S. Brathwaite, Angus M. Davis, Michael S. McCue, Brandon W. Porter, John Giannandrea, Eckart Walther, Anthony Accardi, and Zhe Li.

BACKGROUND OF THE INVENTION

1. Field of the Invention

This invention relates to the field of providing personalized content. In particular, the invention relates to technologies for identifying and registering users using telephone identifying information and personalizing the content presented to them using a profile selected using the telephone identifying information.

2. Description of the Related Art

The following describes various techniques used in telephone systems to provide enhanced user features. First, telephone identifying information will be discussed. Many telephone systems that support enhanced user features use telephone identifying information as a basic component. Then, a variety of example systems will be discussed that use telephone identifying information to provide enhanced user features will be discussed.

1. Telephone Identifying Information

The advent of automatic number identification (ANI) and calling number identification (CNID, CLID, or CID) within the North American Numbering Plan (NANP) has supported the creation of a number of services that use these pieces of telephone identifying information. Comparable systems may be used in other numbering plans and countries to support similar services.

For example, when consumers receive credit cards in the mail, they have to call from their home telephone numbers to activate the cards. This is a typical use of ANI. In this instance, the credit card company matches the ANI information provided when the consumer calls to a previously provided telephone number. If the ANI matches the credit card company's records, the credit card company activates the card.

2. Examples of Telephone System Personalization a. Personalization Generally

With the advent of widely available real-time delivery of telephone identifying information such as ANI, a number of systems have been developed to use that information. One of the most common uses of ANI is for credit card activation. However, previous systems have been single purpose and typically require reference to other information provided separately. For example, credit card activation lines require separately provided information, e.g. your home phone number from the application.

b. Building Personalized Content on the Web

Some systems allow a user to build personalized content over the web. One example is the myYahoo!™ service provided by Yahoo! of Santa Clara, Calif. at <http://my.yahoo-.com/>. The personalized content pages developed on the web are delivered over the web to users accessing the pages with computers. These systems rely on a username and password type system to identify the user rather than telephone identifying information and the delivery mechanisms is different.

c. Interactive Personalization

Still other systems allow users to personalize the content without entering special editing modes. For example, Amazon.com, of Seattle, Wash., keeps track of your purchases and preferences using cookies stored on a customer's web browser.

Some telephone systems provide limited customization capabilities. For example, voice mail systems from Octel, a division of Lucent Technologies, allow a user to set preferences for prompt length, but those settings must be made explicitly by each user. Further, customization is limited to a few options like prompt length and outgoing message selection. The user can not redefine the way the voice mail system works for her/him beyond those narrow customization options. Further, these customizations do not affect the kinds of content and further the presentation is not selected based on telephone identifying information.

d. Locale Selection

Services such as Amtrak's 1-800-USA-RAIL reservation line use telephone identifying information to select an initial region. For example, if you call Amtrak's reservation number in the Northeastern United States, the system presents options relating to the Boston-Washington line. However, if you call from California, the system presents information about travel between San Francisco and Los Angeles.

This can be accomplished by using the calling party's area code and/or exchange included with the telephone identifying information to select a region. The area codes and/or exchanges can then be paired to different scripts or default selections. For example, the area codes for New York City, e.g. "212", could be mapped to the Northeast Corridor while San Francisco, "415", could be mapped to the San Francisco-Los Angeles line. However this does not change the kind of content presented and it is not user-selected.

e. Time Appropriate Information Presentation

Several services provide information through the telephone. That information may be adapted based on the time of day or date.

Some systems provide the information irrespective of the telephone identifying information. One example is Moviefone™, 777-FILM in most locales. Moviefone™ uses the current time at the called number to present appropriate information. The called number can be obtained using the dialed number identification service (DNIS). Thus, if you call Moviefone™ in the San Francisco Bay Area at 10 o'clock in the morning, only movies starting after 10 o'clock in the morning in the San Francisco Bay Area will be presented to you. However, if you call the Philadelphia Moviefone™, +1 (215) 222-FILM, from California, you will hear the Philadelphia movie times in Eastern Time. Thus, at 10 o'clock in the morning Pacific Time, a call to the Philadelphia Moviefone™ will produce information for Philadelphia show times after one o'clock in the afternoon Eastern Time at Philadelphia area theatres.

f. Targeted Advertising

Some free long distance services provide customized advertising to support their services. One example is FreeWay™ offered by Broadpoint, of Landover, Md., <http://www.broadpoint.com/>. These services require an explicit user registration process, typically using a computer to access a web site, to provide the service with a profile. Once the profile is provided, the advertising is targeted to the particular person's explicitly provided demographic information. In some instances, the advertising may be targeted both based on the caller's demographics and their location. Thus, callers from the San Francisco Bay Area with a particular explicit demographic profile may be presented one ad, while callers from outside the San Francisco Bay Area may be presented with another ad. Another, similar, service is offered on by phone by UAccess, Inc., <http://www.uaccess.com/>, by calling +1 (800) UACCESS, and provides consumers targeted advertising based on profile information they enter.

g. Voice Character

Most telephone systems have a small number of voice actors. Continuing with the example of Moviefone™, one actor performs all of the menus and prompts. Other systems may use different voice actors for different subsystems.

These actors are typically selected on a system wide basis and as such, different voices, talents, speeds, characteristics, dialects, and other prosody aspects of the presentation are not user selectable.

h. Purchase Recommendations

Voice systems such as GALAXY from the Massachusetts Institute of Technology (MIT), Cambridge, Mass., have been adapted to provide information about purchasing decisions for used cars. For example, GALAXY has been used to allow for interactive browsing of automobile classified ads. These voice systems are problem domain specific. Further, the systems are designed to locate vehicles matching a particular set of criterion, rather than making actual recommendations.

Other systems are web based. For example, Amazon.com will make book suggestions for users connected to the web via a computer. However, those suggestions are limited to a particular site, e.g. Amazon.com.

i. Voice Login

Most telephone systems require a user to explicitly identify herself/himself by using a combination of a login identifier, e.g. credit card number, account number, etc., and a personal identification number (PIN). Some systems abbreviate this process by allowing a user calling from a particular phone to shortcut this process slightly. For example, callers using a phone number associated with a particular credit card might only be asked to enter the last four digits of their credit card number together with their billing zip code instead of all sixteen digits of the card number. Other products such as Nuance Verfier™ from Nuance Communications, Menlo Park, Calif., support voice login capabilities, e.g. you just speak instead of entering a password.

j. Initial Profile Generation from Database Lookups

Most systems that provide information over the telephone require users to explicitly answer one or more questions in one form or another, e.g. over the phone, the web, and/or in written form. These questions form a demographic and/or psychographic profile for the user. All of these systems require the user to explicitly provide her/his profile information.

SUMMARY OF THE INVENTION

A method and apparatus for providing personalized information content over telephones is described. The creation of a voice portal is supported by the invention. The voice portal uses telephone identifying information to select, or create, a user profile to associate with a particular piece of the telephone identifying information.

The personalized content presented during a telephone call is specific to that user based on the profile associated with her/his telephone identifying information. For example, if a user, John, has previously called from the telephone number 650-493-####, he may have indicated he prefers a Southern dialect. Then, upon subsequent calls to the system from his telephone John will be greeted in a Southern dialect based on the profile associated with his number.

Example personalizations provided by embodiments of the invention will now be described. The system may personalize the session based on the time and/or date as determined from the telephone identifying information. For example, based on the local time for the calling party, time and/or date appropriate options may be presented. For example, if a user calls from California at noon, a restaurant for lunch may be suggested. However, a caller from London at that same moment might be presented evening entertainment selections because of the eight hour time difference.

The system may personalize the session based on the caller's locale as determined from the telephone identifying information. For example, caller's from Palo Alto, Calif. may hear different selections and options than callers from Washington, D.C. This may include locale specific events, e.g. a county fair, locale specific announcements, e.g. flood watch for Santa Clara County, etc.

The system may target advertising based on the caller's demographic and/or psychographic profile. Additionally, the advertising may be targeted based on the telephone identifying information. For example, overall demographic information for a particular area code-exchange combination may be used, e.g. 650-493 corresponds to Palo Alto, Calif., with an average income of $X. On an international scale, this can be used to the extent that the particular numbering plan can be combined with relevant geographic/demographic/psychographic information about callers. Both types of targeted advertising allow the callers to be qualified, e.g. match the requirements of the advertiser. For example, a San Francisco jewelry store might only want to reach households in the Bay Area with an average household income exceeding $50,000 a year. The targeted advertising can ensure that callers presented with the ad are qualified.

The system may adapt the voice character, e.g. the speech patterns and dialect, of the system according to the caller's telephone identifying information and/or the caller's own voice character. Thus, for example, for callers who speak more slowly the system may reduce the speed at which the system speaks and/or increase the volume. This may be based on the telephone identifying information, e.g. hospital, an explicit request by the user, e.g. "Slow down", and/or implicitly based on the caller's speech patterns and interactions with the system.

Based on the caller's profile—as retrieved through the telephone identifying information—and/or demographic information from other sources, e.g. locale based and/or reverse phone directory lookup, the system can make purchasing suggestions. For example, close to a holiday like Mother's day, the system may suggest a gift based on what other people in that locale, e.g. Palo Alto, are buying and or based on the user's own purchasing history, e.g. she/he bought flowers last year. Similarly, the voice portal can recommend the purchase of an audio CD based on previous audio CD purchases.

The system may use a voice password and/or touch-tone login system when appropriate to distinguish the caller or verify the caller's identity for specific activities.

These customizations may be combined in a variety of fashions. Thus, for example, the time, the locale, and a preferred dialect may be used to present a purchase recommendation.

Profiles can be constructed implicitly as the caller uses embodiments of the invention as well as through explicit designation of preferences. For example, the user might specify an existing personalized web site to use in building her/his profile for the voice system. Similarly, for a caller from New York who repeatedly asks for the weather in San Francisco, the system might automatically include the San Francisco weather in the standard weather report without explicit specification, or confirmation.

Additionally, new callers may have an initial profile generated based on one or more database lookups for demographic information based on their telephone identifying information.

BRIEF DESCRIPTION OF THE FIGURES

FIG. 1 illustrates a system including embodiments of the invention used to provide personalized content to users of telephones according to telephone identifying information.

FIG. 2 illustrates the components of a voice portal supporting personalized content.

FIG. 5 is a process flow diagram for providing personalized content according to some embodiments of the invention.

DETAILED DESCRIPTION

A. Introduction

Figure 4:
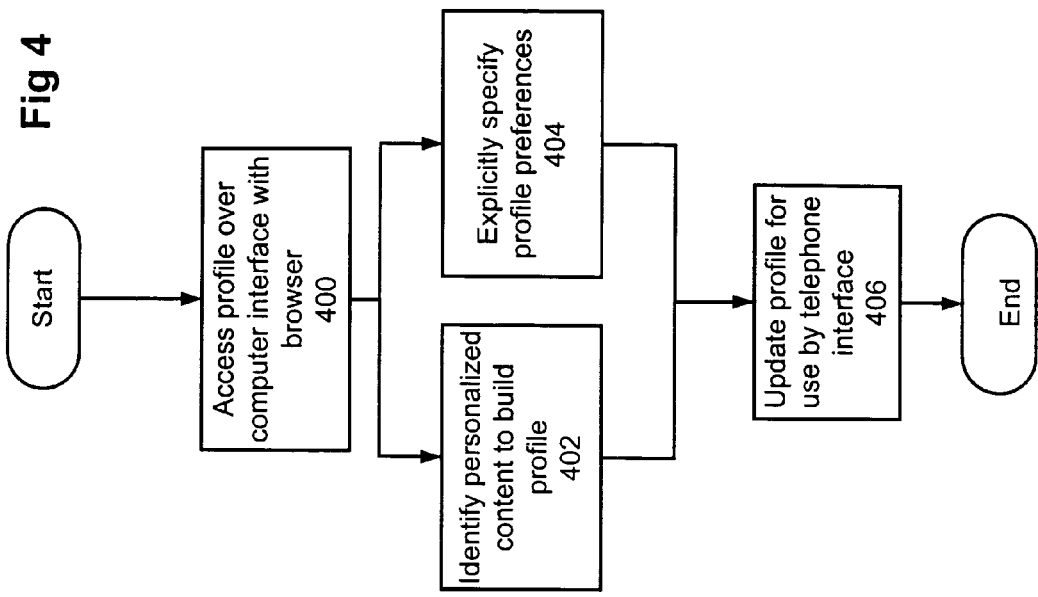
FIG. 4 is a process flow diagram, for personalizing a voice portal over a web based interface.

A voice portal for presenting personalized content over a telephone interface is described. The voice portal allows users of telephones, including cellular telephones, to access a voice portal by dialing a phone number to listen to personalized content. The information provided over the voice portal may come from the World Wide Web (WWW), databases, third parties, and/or other sources.

The term voice portal refers to the capability of various embodiments of the invention to provide customized voice and/or audio content services to a caller. The voice portal can receive dual-tone multi-frequency (DTMF or touch-tone) commands as well as spoken commands to further control the voice and/or audio content presented and the manner of presentation.

Embodiments of the invention use telephone identifying information to personalize caller interactions with the voice portal. This allows the system to present highly customized information to each caller based on a personal profile the system associates with the telephone identifying information.

The invention will be described in greater detail as follows. First, a number of definitions useful to understanding the invention are presented. Then, the hardware and software architecture is presented in the System Overview. Then, a series of sections describe the various personalization features provided by different embodiments of the invention.

B. Definitions

1. Telephone Identifying Information

For the purposes of this application, the term telephone identifying information will be used to refer to ANI information, CID information, and/or some other technique for automatically identifying the source of a call and/or other call setup information. For example, ANI information typically includes a dialed number identification service (DNIS). Similarly, CID information may include text data including the subscriber's name and/or address, e.g. "Jane Doe". Other examples of telephone identifying information might include the type of calling phone, e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information as shown. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touchtone, etc., or through adjustments to the user profile made through the web interface using a computer.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Qualified

The term qualified as it is used in this application refers to whether or not a particular user being presented an advertisement, or other material, meets the demographic and/or psychographic profile requirements for that advertisement, or content. For example, a San Francisco-based bookstore might request that all listeners to its advertisement be located in a particular part of the San Francisco Bay Area. Thus, a user of the system would be qualified if she lived in the designated part of the San Francisco Bay Area.

Different embodiments of the invention may qualify users of the system according to different requirements. For example, in some instances advertising, or content, is qualified solely based on telephone identifying information. In other embodiments the telephone identifying information is used in conjunction with other information such as an associated user profile, a reverse telephone number lookup for locale demographics, and/or other information.

5. Locale

As used in this application, the term locale refers to any geographic area. The geographic area may be a neighborhood, a city, a county, a metropolitan region, a state, a country, a continent, a group of countries, and/or some other collection of one or more geographic areas, e.g. all United State major metropolitan areas.

For this reason, a single user of the system may be considered to be in several locales. For example, a caller from Palo Alto, Calif., might be in the Palo Alto locale, a Silicon Valley locale, a San Francisco Bay Area locale, a Northern California locale, a California state locale, and a United States locale.

Thus, the telephone identifying information for a single telephone number can be mapped to a number of system-defined locales.

6. Voice Character

The term voice character as it is used in this application refers to all aspects of speech pronunciation including dialect, speed, volume, gender of speaker, pitch, language, voice talent used, actor, characteristics of speech, and/or other prosody values. Users can adjust the voice character of the system by changing their voice character settings.

For example, an elderly user could select voice character settings that provide louder volume and slower speech. Similarly, a caller from the South could adjust the voice character settings to support a Southern dialect.

7. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

C. System Overview

First, the hardware and software architecture of a system including an embodiment of the invention will be described with reference to FIGS. 1-2. FIG. 1 illustrates a system including embodiments of the invention used to provide personalized content to users of telephones according to telephone identifying information. The system of FIG. 1 can be used to allow users of standard telephones and cellular telephones to access a voice portal with personalized content from their telephones.

The following lists the elements of FIG. 1 and describes their interconnections. FIG. 1 includes a telephone 100, a cellular telephone 101, a computer 102, a telephone network 104, an Internet 106, a telephone gateway 107, a web server 108, a voice portal 110, a shared database 112 and a personalized site 130. The cellular telephone 101 and the telephone 100 are coupled in communication with the telephone network 104. The telephone network 104 is coupled in communication with the telephone gateway 107. The telephone gateway 107 is coupled in communication with the voice portal 110. The computer 102 is coupled in communication with the Internet 106. The Internet 106 is coupled in communication with the web server 108. The voice portal 110 and the web server 108 are coupled in communication with the shared database 112. The personalized site 130 is coupled in communication with the Internet 106.

The following describes each of the elements of FIG. 1 in greater detail. The use of each of the elements will be described further in conjunction with the sections describing the personalization features.

The telephone 100 and the cellular telephone 101 are two different telephone interfaces to the voice portal 110. The telephone 100 and the cellular telephone 101 may be any sort of telephone and/or cellular telephone. For example the telephone 100 or the cellular telephone 101 may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network (PSTN) and/or some other type of telephone network. For example, some embodiments of the invention may allow users with a voice over Internet Protocol (IP) phone to access the voice portal 110. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g. by a dial-up connection, a digital subscriber loop (DSL), a cable modem, and/or some other type of connection. This allows the computer 102 to communicate with the web server 108. The computer 102 typically provides a visual interface to the WWW and the web server 108 using web browsing software such as Internet Explorer™ from Microsoft Corporation, Redmond, Wash.

Both the web server 108 and the voice portal 110 are capable of communicating with the shared database 112 to register users, build personal profiles implicitly and/or explicitly as will be described more fully below. The database 112 stores profiles for each user based on an association between one or more pieces of telephone identifying information and a particular user. Thus, the database may have a profile for a user Sarah Smith that is keyed to her home telephone number, e.g. 650-493-####. Additionally, Sarah could associate other numbers, e.g. work, cellular, etc., with her profile either implicitly, e.g. by repeatedly calling the voice portal 110 from those numbers, or explicitly, e.g. by adding those numbers to the system directly.

In some embodiments, an existing profile for a web-based portal is adapted for use by the voice portal 110 by associating one or more telephone numbers with the existing profile as stored in the shared database 112. In these embodiments, the existing profile may be further modified for use with the voice portal 110 to allow for different preferences between the web and the voice interfaces.

The call flow arrows 114-122 shown on FIG. 1 will be described in greater detail below.

FIG. 2 illustrates the components of a voice portal supporting personalized content. This could be used to support the voice portal 110 and provide personal content as described above.

The following lists the elements of FIG. 2 and describes their interconnections. The voice portal 110 is coupled in communication with the telephone gateway 107. The voice portal 110 includes a call manager 200, an execution engine 202, a data connectivity engine 220, an evaluation engine 222 and a streaming engine 224. Additionally FIG. 2 includes elements that may be included in the voice portal 110, or which may be separate from, but coupled to, the voice portal 110. Thus FIG. 2 also includes a recognition server 210, a text to speech server 214, an audio repository 212, the shared database 112, a database 226, the Internet 106, a database 228 and a web site 230. The call manager 200 within the voice portal 110 is coupled to the execution engine 202. The execution engine 202 is coupled to the recognition server 210, the text to speech server 214, the audio repository 212, data connectivity engine 220, the evaluation engine 222 and the streaming engine 224. The data connectivity engine 220 is coupled in communication with the shared database 112, the database 226 and the Internet 106. The Internet 106 is coupled in communication with database 228 and the web site 230.

The following describes each of the elements of FIG. 2 in greater detail. The use of each of the elements will be described further in conjunction with the sections describing the personalization features.

Typically, the voice portal 110 is implemented using one or more computers. The computers may be server computers such as UNIX workstations, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming subsystem 224, the audio repository 212, the text to speech 214 and/or the recognition engine 210.

The call manager 200 is responsible for scheduling call and process flow among the various components of the voice portal 110. The call manager 200 sequences access to the execution engine 202. Similarly, the execution engine 202 handles access to the recognition server 210, the text to speech server 214, the audio repository 212, the data connectivity engine 220, the evaluation engine 222 and the streaming engine 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier™ and/or other voice login and verification products.

The text to speech server 214 supports the conversion of text to synthesized speech for transmission over the telephone gateway 107. For example, the execution engine 202 could request that the phrase, "The temperature in Palo Alto, Calif., is currently 58 degrees and rising" be spoken to a caller. That phrase would be translated to speech by the text to speech server 214 for playback over the telephone network on the telephone (e.g. the telephone 100). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request play-back of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing.

The execution engine 202 supports the execution of multiple threads with each thread operating one or more applications for a particular call to the voice portal 110. Thus, for example, if the user has called in to the voice portal 110, a thread may be started to provide her/him a voice interface to the system and for accessing other options.

In some embodiments of the invention an extensible markup language (XML)-style language is used to program applications. Each application is then written in the XML-style language and executed in a thread on the execution engine 202. In some embodiments, an XML-style language such as VoiceXML from the VoiceXML Forum, <http://www.voicexml.org/>, is extended for use by the execution engine 202 in the voice portal 110.

Additionally, the execution engine 202 may access the data connectivity engine 220 for access to databases and web sites (e.g. the shared database 112, the web site 230), the evaluation engine 222 for computing tasks and the streaming engine 224 for presentation of streaming media and audio. The streaming engine 224 may allow users of the voice portal 110 to access streaming audio content, or the audio portion of streaming video content, over the telephone interface. For example, a streaming media broadcast from ZDNet™ could be accessed by the streaming engine 224 for playback through the voice portal.

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases (ODBC), and/or other types of databases. The shared database 112 is represented separately from the other databases in FIG. 2; however, the shared database 112 may in fact be part of one of the other databases, e.g. the database 226. Thus, the shared database 112 is distinguished from other databases accessed by the voice portal 110 in that it contains user profile information.

Having described the hardware and software architecture supporting various embodiments of the invention, the various personalization features provided by different embodiments of the invention will now be described.

D. Telephone Driven Profile Building

Figure 3:
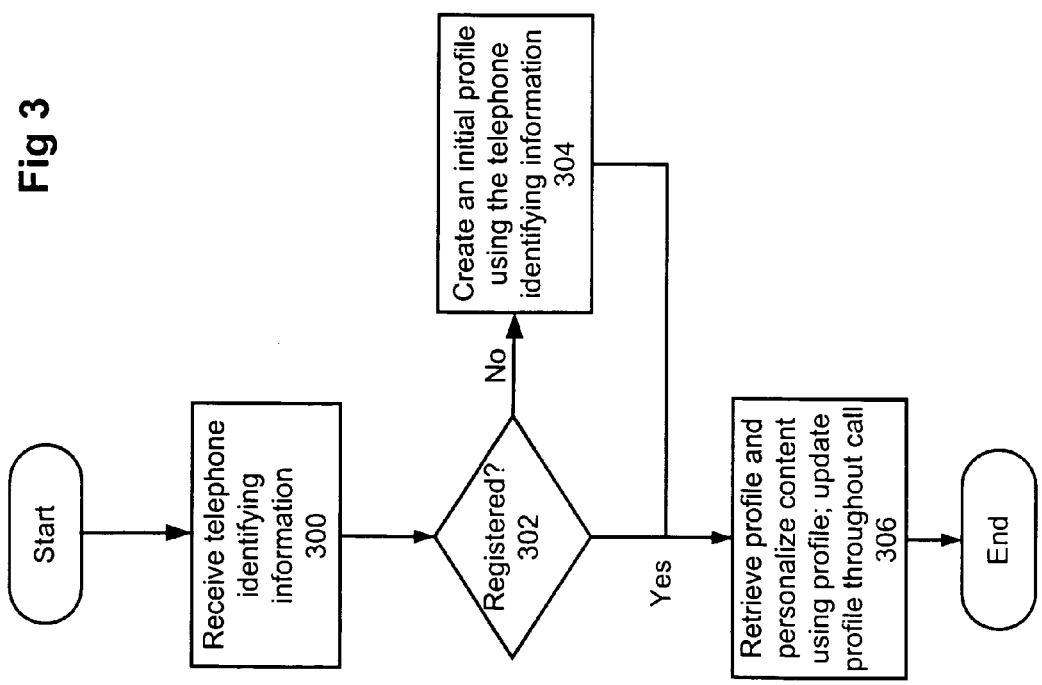
FIG. 3 is a process flow diagram supporting personalization and registration of and for users accessing a voice portal over a telephone interface.

Turning to FIG. 3, the process of creating a profile using a telephone interface will be described. This process will be described with reference to the call flow arrows shown on FIG. 1 as well.

The voice portal 110 is able to flexibly handle multiple callers from a single telephone, e.g. Tom and Dick are roommates and both call from 650-493-####. Similarly, the voice portal 110 is able to handle a single caller that uses multiple telephones, e.g. Tom has a cell phone 650-245-####, his home phone 650-493-####, and a work phone 408-301-####. The manner in which the voice portal 110 can handle some of the above situations will be discussed throughout. In the example used while describing FIG. 3, the process will be described using a caller Jane Smith as an exemplary caller who has never registered with the voice portal 110 from any telephone and an exemplary caller John Doe who has previously called the voice portal 110 from his telephone 100.

First, at step 300, telephone identifying information is received. This is shown in FIG. 1 by call flow arrow 114 representing the transfer of telephone identifying information through the telephone gateway 107 to the voice portal 110. This step occurs after a user has placed a call to the voice portal 110 with a telephone, e.g. the telephone 100.

Next, at step 302, a determination is made as to whether the telephone identifying information corresponds to a known profile, e.g. is the user registered? Some examples may be illustrative. If Jane Smith uses the cellular telephone 101 to call the voice portal 110 for the first time, her telephone identifying information will not be associated with any existing unique profile in the shared database 112. Therefore, at step 302, the determination would be made that she is not registered and the process would continue at step 304. In contrast, John Doe has previously called the voice portal from the telephone 100 and so his telephone identifying information will be associated with a profile in the shared database 112 and the process would continue at step 306.

If, the telephone identifying information is not associated with an existing profile in the shared database 112, a new profile is created at step 304. The new profile may be initialized using a variety of information derived from the telephone identifying information and/or predetermined values for the voice portal 110. Thus, for example, when Jane Smith calls for the first time from the cellular telephone 101, an initial profile can be created using the calling number, e.g. 650-493-####, included in the telephone identifying information to select initial profile settings. The call flow arrow 116 shows this process on FIG. 1. The use of the telephone identifying information to create an initial profile is discussed below in the section "Automatic Profile Initialization".

In some embodiments, the profile is not initialized using the telephone identifying information. In other embodiments, the user may be explicitly queried by the voice portal 110 to create one or more components of the initial profile, e.g. "Please speak your first name", to allow for more personalized prompting by the voice portal 110. Once a profile is created, the process continues at step 306.

At step 306, the profile is retrieved from the shared database 112 as shown by the call flow arrow 118. The profile can be updated throughout the call based on the user's behavior and actions—implicit preferences—as well as explicit requests from the user to customize the voice portal 110. Once a profile is selected at step 306, the personalized content can be presented to the user as shown by the call flow arrow 122 in FIG. 1.

For example, John Doe, who is calling from the telephone 100, already has a profile in the shared database 112. That profile may indicate that John prefers a southern dialect and likes to hear a quick stock market report immediately on call in. Thus, for John, his telephone identifying information serves to log him directly into the system and trigger the personalized behavior unique to him: a quick stock market report in a southern dialect. In contrast, a different caller, Sarah Brown, from a different telephone will be provided different personalized content based on that telephone identifying information.

The voice portal may support multiple callers from a single telephone. For example, Sarah Brown and John Doe may both use the telephone 100 to call the voice portal 110. In the case where two or more profiles are identified with the same telephone identifying information, the voice portal may prompt for a password or other unique identifier, either as voice or touch-tone, to select among the profiles.

However, as a general matter, the voice portal is configured to minimize the need for a caller to provide a password. Thus, during a single call session, the caller is typically only asked to provide her/his password a single time. However, some embodiments of the invention may require that a password always be used to complete commercial transactions and/or after the passage of a predetermined period, e.g. ten minutes since last password prompt. In some embodiments, the user may adjust her/his profile to allow login without a password for playback features.

Also, a single profile can be associated with multiple calling numbers. For example, the user Jane Doe could specify that both the telephone 100 and the cellular telephone 101 should be associated with her profile. Similarly, if Jane calls from a new telephone, e.g. pay phone, she can provide her existing telephone number and her password to access her profile. In some embodiments, whenever the user calls from a new telephone number, she/he is prompted as to whether to remember the number for future use. In some embodiments, additional telephone identifying information, e.g. this is a pay phone, is used so that the caller is not prompted to associated telephone numbers that are likely to be single time uses with her/his profile. Similarly, voice verification may be used to recognize a caller's voice instead of, or in addition to, using a password or other identification number.

Typical events that would require a password, or that the user be authenticated previously with a password, might include adding and removing items from the user profile through explicit commands as well as requests for specific personal information, e.g. that user's stock portfolio, bank account balances, etc.

It is not necessary for callers to the voice portal 110 to explicitly specify their preferences using this embodiment of the invention. The callers' behaviors and actions are used by the voice portal 110 to adopt implicit preferences, sometimes after receiving confirmation. For example, behaviors and actions reflecting repeated access to a content in a particular topic, or a particular topic, may cause the voice portal 110 to automatically include the repeatedly requested content in the default message.

For example, if a caller from New York City repeatedly asks for the weather in San Francisco, the system can add the San Francisco weather to the standard weather report. Alternatively, the system may request confirmation before adding the weather report, e.g. "Would you like me to include San Francisco in the standard weather report?" Similarly, at the level of topics, users who repeatedly ask for information about business related issues may find that the system will adjust the main menu to include business. Similarly, if that same user never asks for sports scores, that option may drop off the main menu. In some embodiments, the system may ask for confirmation before modifying the menu choices, or the system may notify the user of a modification and/or allow a user to review/change past modifications. As a result, the structure and content of the call may change, e.g. San Francisco weather will be announced at the beginning of future calls and sports information may be omitted.

Through the use of this process, the need for a specialized editing mode of the type seen on customizable web portals is reduced. The user's actions and behaviors shape the options presented to her/him. Thus, reducing the need to explicitly pick topics and/or content in an editing mode. However, some embodiments of the invention may allow for explicit profile creation in an editing mode over the web, see below, and/or over the telephone. Also, users are typically permitted to add and remove topics and/or items at will with explicit commands, e.g. "Remember this", "Remove", "Add to my stock list", etc.

E. Web Driven Profile Building

Turning to FIG. 4, the process of modifying a profile for use over a telephone interface over the web will be described. This process will be described with reference to the call flow arrows shown on FIG. 1 as well.

The process shown in FIG. 4 assumes that a profile has already been created, e.g. by calling for the first time as described above. However, in some embodiments of the invention, users may create profiles using the web interface by providing the telephone identifying information for their primary calling phone number and a password. As is the case with the telephone registration process described in step 304, the telephone identifying information provided, here the primary calling phone number, can be used to create the initial profile.

Starting at step 400, the profile is accessed using a computer (e.g. the computer 102) via a web interface. The web interface is provided by a web server (e.g. the web server 108) and allows for access to the shared database 112 as shown by the call flow arrow 120.

Once the user has signed in to access her/his profile on the computer, she/he can manually identify content and topics to build her/his profile at step 404. This can be supported by allowing the user to specify topics from a list of topics and then specifying per topic content from a list of content. For example, the topics might include business, sports, news, entertainment, and weather, to name a few. The user could include weather, news, and business in her/his main menu and then further customize the specific content to be presented within those topics. For example, within weather, the user might select the specific cities she/he wants listed in her/his weather menu and/or the cities for which the weather is automatically played.

Alternatively, at step 402, the user can identify a web location with personalized content to use in building her/his profile, e.g. a uniform resource indicator (URI). For example, FIG. 1 includes the personalized site 130. The personalized site 130 could be a customized portal web page, e.g. myYahoo!, My Netscape, etc., a home page the user herself/himself has designed, and/or any other web page that includes content of interest to the user. The user can identify the personalized site with a uniform resource indicator (URI), including a login identifier and password if necessary, e.g. for myYahoo! The personalized site 130 can then be accessed and the pertinent user preferences, e.g. news, stocks, selected. Taking the example of a customized portal site, the main topics selected, e.g. horoscopes, and the content within, Sagittarius, could be adopted. However, the voice portal 110 may present its own content for that particular item, e.g. the version of the Sagittarius horoscope on the voice portal 110 not the version from the personalized site 130.

The processes of step 402 and step 404 can be used together allowing a user to quickly transfer preferences from a web portal to her/his voice portal while still supporting explicit personalization.

Alternatively, in some embodiments of the invention, an existing web portal profile is voice enabled for use by a voice portal through the association of telephone identifying information with the existing web portal. In this embodiment, at step 402, the telephone identifying information, e.g. the primary calling number, is associated with an existing web profile, e.g. myYahoo! profile, stored in the shared database 112 and that existing web profile is then usable from the voice portal 110 either using voice or touch-tone commands.

Additionally, web sites like the personalized site 130 may be accessed using the voice portal 110 in some embodiments of the invention through the use of the data connectivity engine 220 as shown in FIG. 2.

F. Profile Building Via Other Web Sites

Some embodiments of the invention may allow users of the voice portal 110 to add to their profile from other web sites. For example, if a user of the computer 102 is accessing a web site (e.g. the personalized site 130), the web site might include a link like "Add this to your voice portal." Thus, for example, from a service such as MapQuest™ or Ameritrade™, the user could click on a link to add a particular piece of content or a particular topic to their portal for the voice portal 110.

For example, a user could add her/his "QQQ" stock symbol to her/his profile on the voice portal 110 even though the voice portal 110 may be operated independently of the particular web site.

This type of web based profile building allows for widespread profile building for the voice portal 110 from a variety of Internet sites. Also, in some embodiments, the web browser software on the user's computer (e.g. the computer 102) can support an option to add a bookmark to the user's profile stored in the shared database 112 for the voice portal 110. For example, a menu option in the browser on the computer 102 might include "Add Page to Voice Portal Shortcuts" and upon selecting that menu option, the current web page would be added to the user's profile on the voice portal 110.

This would typically be accomplished by accessing a URI on the web server 108 that included the information to be added. At that point, the web server 108 might ask for a primary calling phone number and/or a password. In some embodiments, a cookie stored by the browser on the computer 102 may be used to obviate one or both of these steps. After the user provides the information, or it is accepted automatically, a confirmation page may be shown including a return link to the originating web page. Several example URI's for adding content are shown below:

```
<http://www.voiceportal.com/add.cgi?topic=stock%20quote&content=QQQ>
<http://www.voiceportal.com/add.cgi?shortcut=MapQuest&ref=www.mapquest.com/voice.vxml>
<http://www.voiceportal.com/add.cgi?shortcut=myYahoo&ref=my.yahoo.com/voice.vxml&login=jdoe>
```

These examples are illustrative of the various types of URI's that can be placed as links on web sites to allow users of the voice portal 110 to further customize their profile.

G. Locale Based Personalization

Turning to FIG. 5, the basic personalization framework used by several embodiments of the invention is presented. At step 500, a request is made for content, or a topic. Then one or more of steps 502-510 take place, in parallel or sequence, and then the content is presented at step 512. Which of steps 502-510 occur for a given request may be determined based on the topic or content requested. For example, step 504 can be omitted when non-time dependent information is presented.

Turning to step 502, the customization of content based on the calling locale. The telephone identifying information includes information about the caller's locale independent of any user provided registration information. This information can be derived from telephone routing tables that provide a descriptive name for each area code/exchange combination within the North American Numbering Plan (NANP). Thus, the phone number 650-493-#### would be associated with "Palo Alto, Calif.". Similarly, 650-592-#### would be associated with "San Carlos, Calif.".

This information may be directly present in the telephone identifying information provided to the voice portal 110, or may be ascertained from a local exchange routing guide (LERG). For international callers outside the NANP, similar types of telephone identifying information can be mapped to locales within countries to the extent permitted by the particular numbering plan.

The city-state combination may correspond to multiple locales for the purposes of the voice portal 110. For example, a county-wide or multi-city locale can be defined that encompasses multiple area code/exchange combinations. Thus, a single caller may be in multiple locales.

Locale information can be further refined through the use of additional databases, e.g. city/state to zip code databases, street address to five digit zip code databases, reverse lookup databases that map phone numbers to street addresses, longitude-latitude conversion databases, and/or other databases that provide locale related information from telephone identifying information. Thus, for example, V and H coordinates might be determined using the telephone identifying information. Those can be further converted to a longitude and latitude to determine the locale. Alternatively, a reverse phone number database could be used to find a specific street address for the telephone identifying information.

Examples of the uses for the locale information include: providing locale-appropriate lottery results, providing driving directions to a requested destination, providing locale-appropriate weather reports, providing locale-appropriate show times for movies other events, e.g. cultural, governmental, etc., traffic reports, yellow page listings, and/or providing other locale-related information.

H. Time/Date Based Personalization

Turning to step 504, the customization of content based on the time and/or date will now be described. The telephone identifying information includes information about the caller's locale independent of any user provided registration information. This information can be derived from telephone routing tables that provide a descriptive name for each area code/exchange combination within the NANP. Thus, the phone number 650-493-#### would be associated with "Palo Alto, Calif." and thus the correct time zone, Pacific, could be selected as well.

This time zone may be directly present in the telephone identifying information provided to the voice portal 110, or may be ascertained from the LERG. For international callers outside the NANP, similar types of telephone identifying information can be mapped to locales within countries to the extent permitted by the particular numbering plan. Thus, callers from United Kingdom numbers would be mapped to British Standard Time.

The time zone information allows the voice portal 110 to customize the presentation of information based on the time in the caller's locale. Callers can use a single nationwide, or international, number to reach the voice portal 110, e.g. 800-###-####. The voice portal 110 will use the time zone information to adjust the content presented to each user.

Thus, during the lunch hour, the voice portal 110 might report a stock quote to the user while on a Friday evening, the voice portal 110 might suggest a movie. For example, "It is Friday night, would you be interested in seeing a movie?" A "yes" response by the caller will lead to the presentation of a list that is both time and date adapted and locale appropriate. For example, a caller from Palo Alto at six o'clock p.m. on a Friday would hear about show times after six o'clock p.m. in his local area.

If necessary, the voice portal 110 may connect the user to an appropriate transaction system to complete a user requested transaction such a the purchase of an airline ticket, a movie ticket, an audio CD, etc. However, in many instances, the voice portal 110 may be able to directly complete the transaction using the data connectivity engine 220 and access to the Internet 106 and/or one or more databases (e.g. the database 226). This process can occur even if the caller has not explicitly provided the voice portal 110 her/his home location or the current time. For example, this personalized content might be presented immediately at after step 304 of FIG. 3 in step 306.

Similarly, other time sensitive information can be presented such as airline schedules, cultural and other events, etc. Thus, for example a caller asking for flight times to New York from a 650-493-#### telephone number might be prompted to select one of the three local airports: San Francisco International, San Jose International, and Oakland International, and then the flight times to New York after the current time in the Pacific time zone would be presented.

Some additional examples include customizing the presentation of business reports based on whether or not the market is open; modifying the greeting prompt based on the time of day; and providing traffic information automatically during commute hours, but not at other times.

I. Targeted Advertising

Embodiments of the invention support the presentation of targeted advertising, or other content, to callers of the voice portal 110 as shown at step 508. The two primary types of targeted advertising supported by embodiments of the invention will be described. The different types of targeted advertising can be combined as well.

1. Based Solely on Telephone Identifying Information

Telephone identifying information can be used to reference demographic information about callers from a particular area. For example, if the telephone identifying information includes the calling number 650-493-####, corresponding to Palo Alto, Calif., general demographic information about callers from that particular region can be used to target the advertising, or other content. Further, if a reverse lookup database is used, the phone number can, in some instances, locate specific demographic information for a given household, or caller.

This personalization allows the targeting of advertising to qualified callers by the voice portal 112. For example, an advertiser of expensive luxury vehicles might request that its callers be qualified based on their income, or a particular psychographic attribute, e.g. fun-loving. In that case, the demographic profile corresponding to the telephone identifying information can be used to qualify the caller. Thus, callers from the relatively affluent city of Palo Alto, Calif. might receive the advertising. Similarly, if a particular household meets the requirements based on a reverse lookup, those households can receive the advertising as well.

2. Based on Profile

Another source of information about the caller is the profile used by the shared database 112. This profile may indicate interests based on the explicit and implicit preferences, e.g. likes sports, and can be used in combination with the telephone identifying information to more closely tailor ads to the caller.

For example, if the caller has added movie and entertainment information to her/his profile, either explicitly or implicitly, advertising related to movies and entertainment could be favored over other qualified advertising based on the caller's profile. Other examples include providing brokerage, and other financial services, advertisements to callers who frequently check stock quotes and/or have a customized stock list.

J. Adaptive Voice Character

Turning to step 508, the customization of content through adaptive voice character will now be described. The telephone identifying information includes information about the caller's locale independent of any user provided registration information. The locales may be associated with one or more standard voice character settings, e.g. for dialect, and also idiomatic speech. Thus, callers from California may receive different prompts and a different dialect from the voice portal then callers from Florida.

Similarly, the telephone identifying information may include information about the type of phone, e.g. pay phone, hospital phone, etc., that can be used to adjust the voice character, e.g. louder and slower speech.

Additionally, the caller's speaking voice may be used to refine the voice character of the system. Thus, callers with speech patterns from a particular region of the country may find that after several verbal interactions with the voice portal, the content being presented at step 512 is being spoken using a voice character more suited to their own speech patterns. Similarly, in response to callers who request that information be repeated several times, the voice character for those callers may be slowed and played back louder. Additional examples include allowing users to select different voice actors, different background music and/or sound effects, control the verbosity of prompts, etc.

K. Purchase Recommendations

Turning to step 510, the customization of content through purchase suggestions. Based on the caller's profile—as retrieved through the telephone identifying information—and/or demographic information from other sources, e.g. locale based and/or reverse lookup, the system can make purchasing suggestions.

The suggestions could be based on the caller's locale and what others in that locale have purchased. In other embodiments, the suggestions may be based on the profile of the user relative to other user's purchases. In some embodiments, approaches such as collaborative filtering are used to generate recommendations.

Examples of recommendations may include particular goods and services, e.g. flowers for Mom a few days before Mother's Day. Further, the exact suggestion may vary based on the caller's past habits, e.g. in the past you bought chocolates so this year chocolates might be suggested again. Alternatively, if many people from your locale are buying a particular book that might be suggested as well. The particular purchase recommendation may relate to goods and services offered independently, by, and/or in affiliation with the operator of the voice portal 110.

L. Voice Login

As discussed above, the system may support the use of one or more passwords, either spoken or touch-tone for login and authentication purposes. The passwords provide for protection against modifications to a user's profile without authentication. Additionally, certain specific actions, e.g. making a purchase, listening to certain types of personalized content, etc., may require authentication.

Typically, the authentication system will support either a voice or a touch-tone password for users of the voice portal 110. This flexibility addresses situations where the voice password is not working due to line conditions and/or conditions of the calling telephone. Products such as Nuance Verifier™ and/or other voice login and verification products may be used to provide the voice login feature. In some embodiments, both types of authentication may be required.

Once logged in, or authenticated, embodiments of the invention may minimize the need for the user to re-authenticate herself/himself, as described above. Additionally, the password, either voice and/or touch-tone, used for authentication for telephone sessions may be the same or different as any passwords used for authentication for web access to the profile customization options described in conjunction with FIG. 4.

M. Automatic Profile Initialization

As discussed in conjunction with FIG. 3, it may be desirable to initialize the profile using the telephone identifying information. The telephone identifying information can be used to select an appropriate demographic profile and list of topics based on the calling locale. In other embodiments, a reverse lookup of the calling number provided with the telephone identifying information is used to obtain a specific demographic profile for a caller and/or her/his household.

Then the demographic information derived from the locale and/or the reverse lookup are used to set initial profile values. For example, the user's income might be estimated based on the average income for the calling locale, e.g. Palo Alto, Calif., or from demographic information from the reverse lookup. Similarly, the caller's initial topics might be selected based on commonly selected topics for her/his locale and/or the preferences available based on the demographic information retrieved by the reverse lookup.

These initial values may be revised based on a caller's later actions. For example, if the initial estimate of a caller's age is too high, later actions may cause that information to be revised. Similarly, callers may be permitted to explicitly provide certain types of demographic information as needed. For example, the user might provide her/his birth date to a horoscope feature provided by the voice portal 110, in that instance, the birth date might be incorporated into the profile.

N. Conclusion

Thus, a voice portal for presenting personalized content over a telephone interface has been described. The information provided over the voice portal may come from the World Wide Web (WWW), databases, third parties, and/or other sources. Telephone identifying information is used by embodiments of the invention to personalize caller interactions with the voice portal. This allows the system to present highly customized information to each caller based on a personal profile the system associates with the telephone identifying information.

A number of different personalization features provided by embodiments of the invention have been described, those features can be combined in a number of ways to provide personalized content.

The foregoing description of various embodiments of the invention has been presented for purposes of illustration and description. It is not intended to limit the invention to the precise forms disclosed. Many modifications and equivalent arrangements will be apparent.

What is claimed is:

1. A method performed by a voice portal, comprising:
   receiving a call from a caller, where the call includes identifying information;
   identifying a first voice character, using the identifying information, to be used by the voice portal when audibly interacting with the caller;
   detecting a speaking voice associated with the caller through the voice portal interaction with the caller;
   identifying a second voice character using the detected speaking voice associated with the caller;
   changing from the first voice character to the second voice character when further audibly interacting with the caller;
   through interacting with the caller via the voice portal, automatically detecting caller behavior indicative of a situation where caller experience would improve upon an adjustment to the second voice character; and
   adjusting the second voice character in response to detecting such caller behavior;
   permitting the caller to select a third voice character;
   wherein, the selecting the third voice character comprises the caller selecting the background music and controlling the verbosity of prompts;
   applying the third voice character when further audibly interacting with the caller.

2. The method of claim 1, further comprising: determining a locale associated with the call using the identifying information.

3. The method of claim 2, wherein the identifying the first voice character includes:
   determining the first voice character as a voice character associated with the determined locale.

4. The method of claim 2, further comprising:
   presenting prompts to the caller using the determined locale.

5. The method of claim 1, further comprising:
   determining a type of communication device used by the caller using the identifying information.

6. The method of claim 5, wherein the identifying the first voice character includes:
   determining the first voice character based on the determined type of communication device used by the caller.

7. The method of claim 1, wherein, the automatically detecting caller behavior indicative of the situation where caller experience would improve comprise, detecting the situation where the caller requests that information be repeated several times over the voice portal.

8. The method of claim 7, further comprising, in response to detecting the situation where the caller requests that information be repeated several times over the voice portal, adjusting the second voice character to be playbacked slower or louder.

9. A system, comprising:
   a voice portal for receiving a call from a caller, where the call includes identifying information;
   a recognition server for identifying a first voice character using the identifying information;
   wherein the voice portal further facilitates audible interaction with the caller using the first voice character;
   wherein the recognition server, through interaction with the caller via the voice portal, automatically detects caller behavior indicative of a situation where caller experience would improve upon an adjustment to the first voice character;
   an execution engine for identifying a second voice character using the detected caller behavior;
   wherein the voice portal facilitates changes from the first voice character to the second voice character; and
   a text to speech server for audibly interacting with the caller using the second voice character;
   wherein the recognition server permits the caller to select a third voice character;
   wherein the selection of the third voice character comprises the caller selecting background music and controlling the verbosity of prompts;
   wherein the execution engine applies the third voice character when further audibly interacting with the caller.

10. The system of claim 9, wherein the voice portal determines a locale associated with the call using the identifying information.

11. The system of claim 10, wherein the execution engine determines the first voice character as a voice character associated with the determined locale.

12. The system of claim 10, wherein the voice portal presents prompts to the caller based on the determined locale.

13. The system of claim 9, wherein the voice portal determines a type of communication device used by the caller based on the identifying information.

14. The system of claim 13, wherein the recognition server determines the first voice character based on the determined type of communication device used by the caller.

15. The system of claim 9, wherein the voice portal determines actions of the caller during the audible interaction with the caller.

16. The system of claim 15, wherein the recognition server the second voice character is selected using the detected speaking voice associated with the caller.

17. A method, comprising:
receiving a call from a caller, where the call includes identifying information for identifying a locale and determining a type of communication device used by the caller;
identifying a first voice character using the locale and the type of communication device used by the caller determined by the identifying information;
providing audible prompts to the caller in a speech pattern using the first voice character;
detecting a speaking voice associated with the caller;
determining actions of the caller;
identifying a second voice character using the detected speaking voice associated with the caller and the determined actions of the caller;
through interacting with the caller via the voice portal interaction, automatically detecting caller behavior indicative of a situation where caller experience would improve upon an adjustment to the second voice character;
adjusting the second voice character in response to detecting such caller behavior;
providing further audible prompts to the caller in a speech pattern using the second voice character;
permitting the caller to select a third voice character;
wherein the selecting the third voice character comprises the caller controlling the verbosity of prompts and selecting the background music; and
applying the third voice character when further audibly interacting with the caller.

* * * * *